Dec. 23, 1952     R. R. BARBER ET AL     2,622,820
APPARATUS FOR HANDLING STRIP MATERIAL
Filed July 7, 1949     4 Sheets-Sheet 2

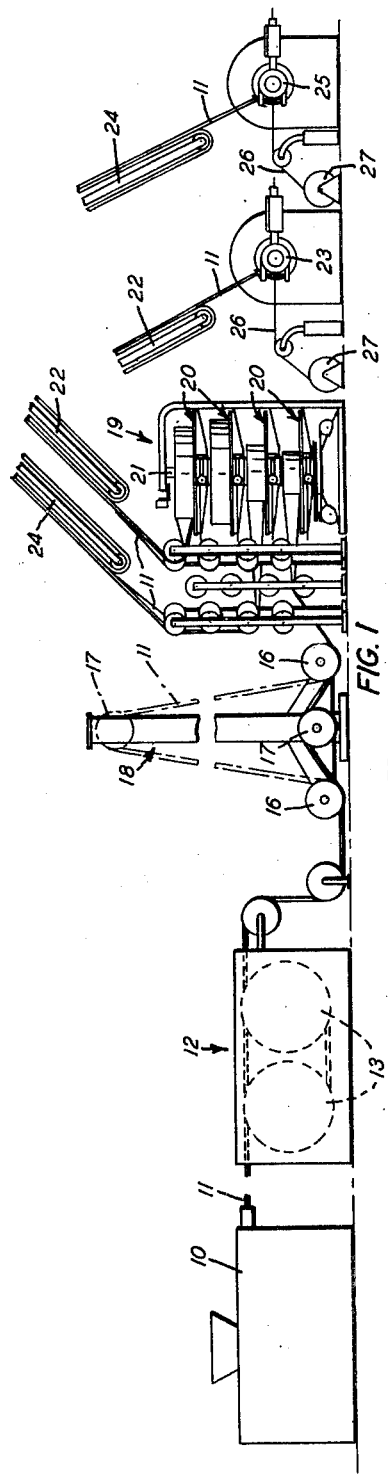
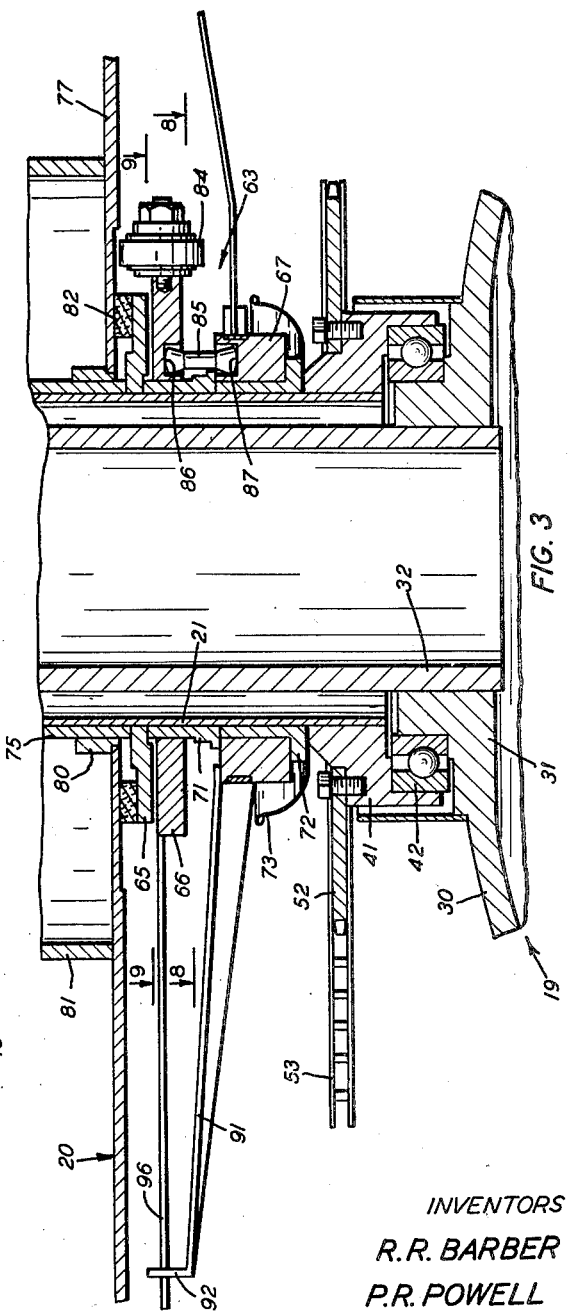

INVENTORS
R. R. BARBER
P. R. POWELL
B. A. RAETSCH
BY *[signature]*
ATTORNEY

Dec. 23, 1952 R. R. BARBER ET AL 2,622,820
APPARATUS FOR HANDLING STRIP MATERIAL
Filed July 7, 1949 4 Sheets-Sheet 3
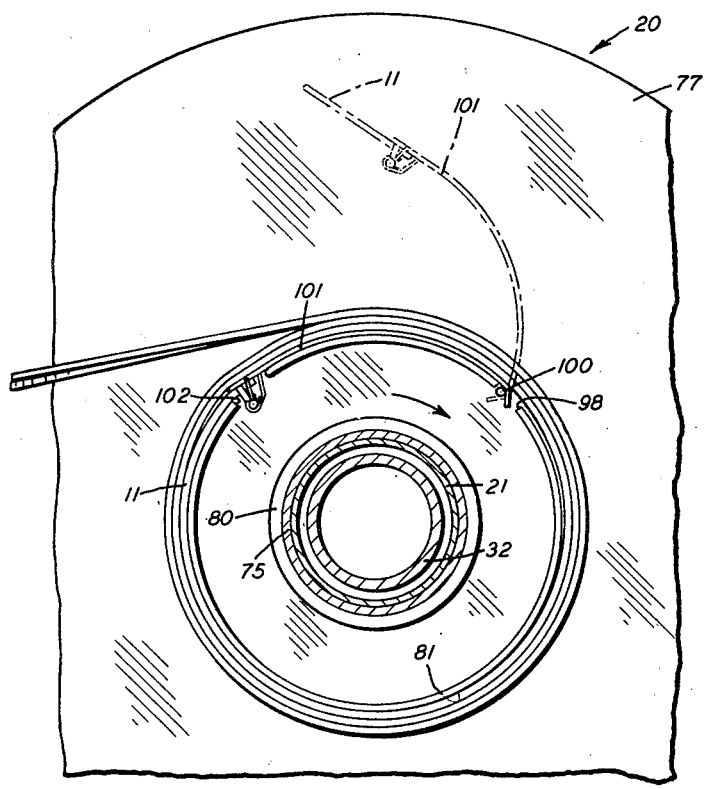
FIG. 4
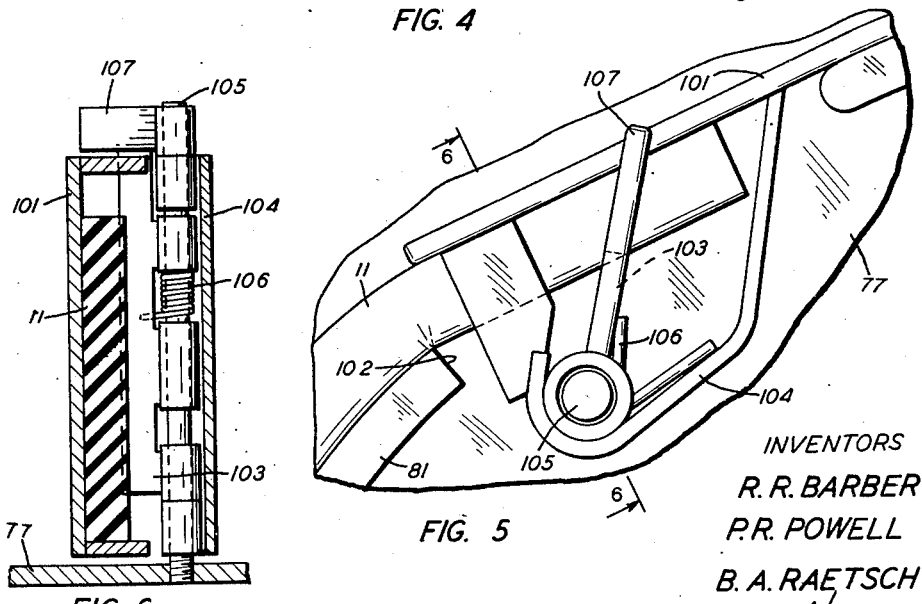
FIG. 6
FIG. 5
INVENTORS
R. R. BARBER
P. R. POWELL
B. A. RAETSCH
BY
ATTORNEY

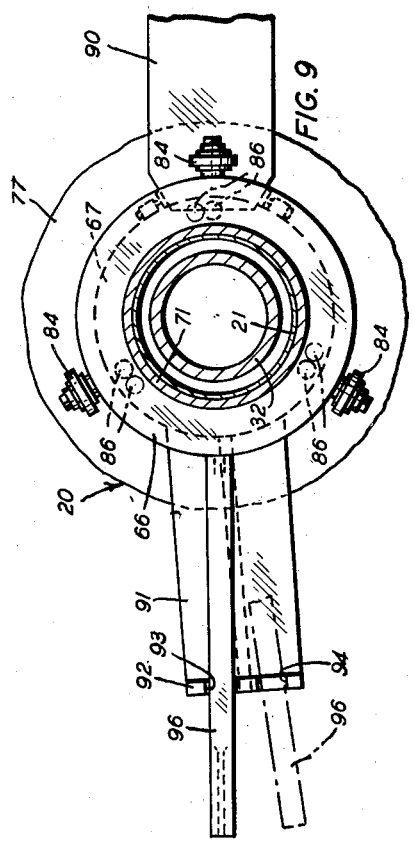
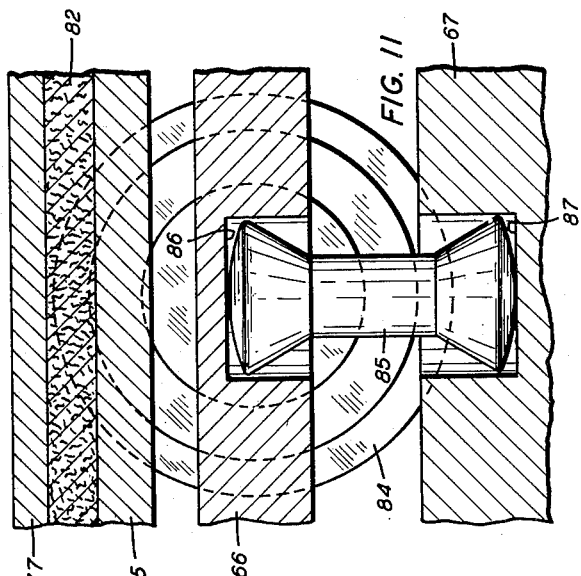
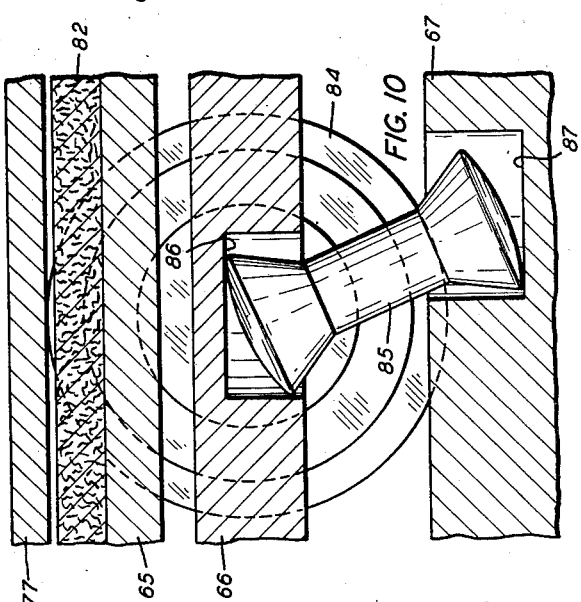
INVENTORS
R. R. BARBER
P. R. POWELL
B. A. RAETSCH

Patented Dec. 23, 1952

2,622,820

UNITED STATES PATENT OFFICE 2,622,820

APPARATUS FOR HANDLING STRIP MATERIAL

Robert R. Barber, Idlewild, Paul R. Powell, Baltimore, and Bruno A. Raetsch, Parkville, Md., assignors to Western Electric Company, Incorporated, New York, N. Y., a corporation of New York Application July 7, 1949, Serial No. 103,433

5 Claims. (Cl. 242—75)

This invention relates to apparatus for handling strip material, and more particularly to apparatus for handling strip material which may be used for insulating or jacketing electrical conductors, or the like.

In the manufacture of electrical conductors, a previously mixed, extrudable compound is introduced into an extruding machine which extrudes the compound in the form of an insulating cover or jacket around a core advancing through the apparatus. Heretofore, in order to maintain the extruding machine in continuous operation for sustained periods of time, successive batches of the mixed compound were converted into strip form and suitable lengths thereof were coiled up on carriers, which could be conveyed readily to the extruding machine. In installations where a plurality of extruding machines are operating simultaneously to manufacture electrical conductors in large quantities, this procedure of handling the strip material between the strip-forming apparatus and the extruding machines proved to be costly and time consuming.

Compound mixing apparatus of the type generally used, usually is capable of supplying a continuous strip of the compound at such a rate that it is able to supply a plurality of extruding machines. Where a single strip-forming apparatus is used to supply a plurality of extruding machines, it is obviously necessary to provide a suitable takeup and storage means for the compound strip at a point between the strip-forming means and the extruding machines in order to maintain an adequate supply of compound strip for each extruding machine.

An object of the invention is to provide new and improved methods of and apparatus for handling strip material.

Another object of the invention is to provide new and improved methods of and apparatus for handling a strip of an insulating or jacketing compound between an apparatus which is forming the strip and an apparatus which is consuming the strip.

One apparatus, which may be used in handling strip material between a strip-forming apparatus and a strip-consuming apparatus and which exhibits certain features of the present invention, comprises a continuously rotating shaft, a plurality of reels loosely positioned on the said shaft, means secured to the shaft for rotating each reel independently of the other reels, and means for selectively engaging each reel with its respective rotating means or disengaging each reel from its rotating means so that it is freely rotatable about the shaft, whereby some of the reels may be rotated to take up the strip material while the compound is withdrawn from a full reel.

A clear understanding of the invention will be had from the following detailed description of a specific embodiment thereof, when read in conjunction with the appended drawings, in which:

Fig. 1 is a schematic diagram of a strip-handling system including strip-handling apparatus embodying certain features of the present invention;

Fig. 3 is an enlarged, fragmentary, vertical section of a portion of the strip-handling apparatus shown in Fig. 2;

Fig. 4 is a horizontal section taken along line 4—4 of Fig. 2;

Fig. 5 is an enlarged, fragmentary view of a portion of the apparatus shown in Fig. 4;

Fig. 6 is a vertical section taken along line 6—6 of Fig. 5;

Fig. 8 is a horizontal section taken along line 8—8 of Fig. 3;

Fig. 9 is a horizontal section taken along line 9—9 of Fig. 3;

Fig. 10 is an enlarged, vertical section taken along line 10—10 of Fig. 8, and

Fig. 11 is a duplicate of Fig. 10 but showing some of the elements of the apparatus in an operating position.

Figure 2:
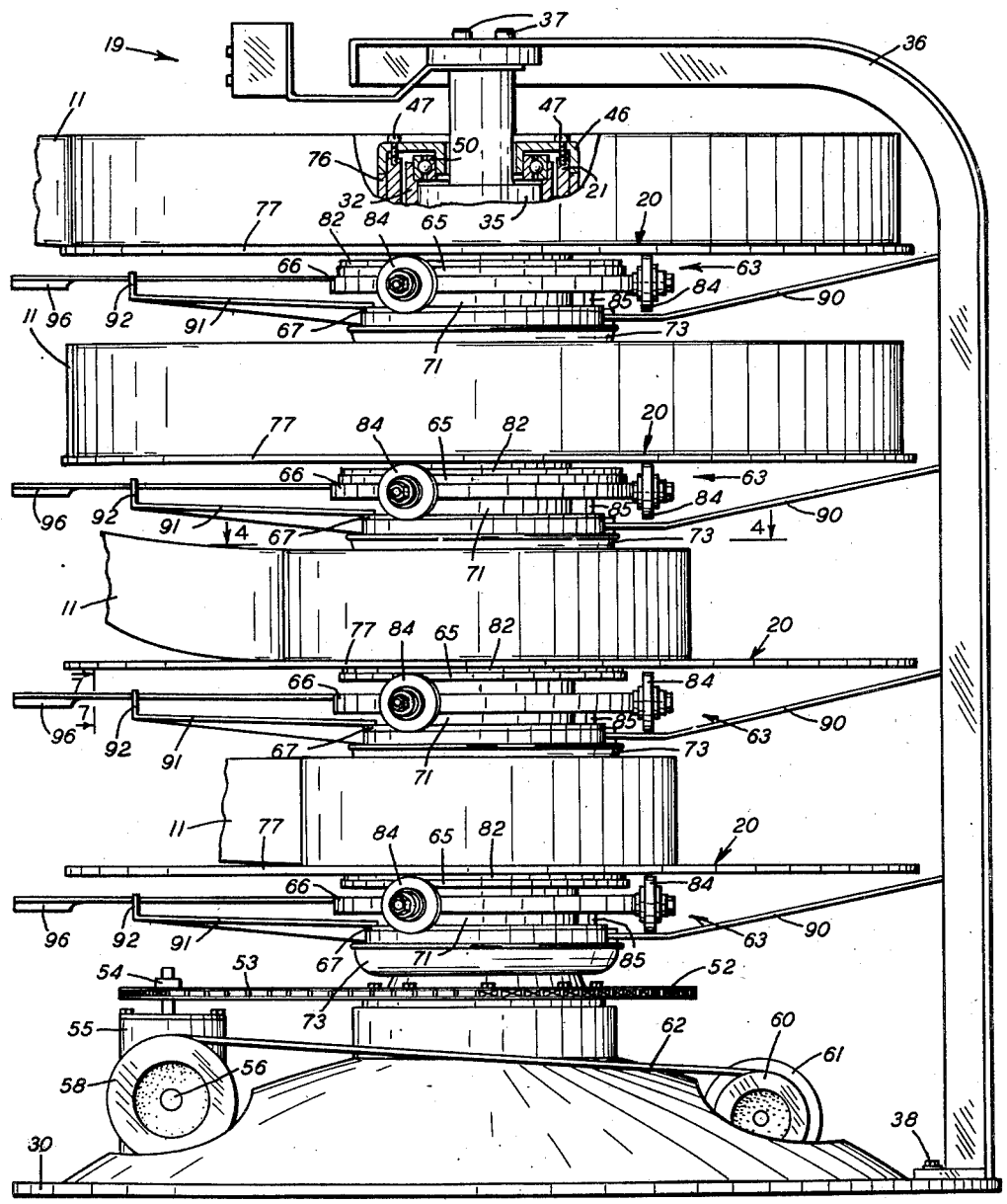
Fig. 2 is an enlarged elevation of a portion of the apparatus shown in Fig. 1.
Figure 7:
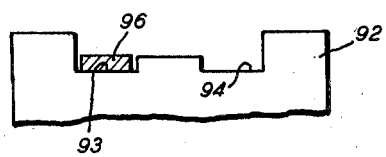
Fig. 7 is a vertical section taken along line 7—7 of Fig. 2.

Referring now to Fig. 1 of the drawings, there is shown schematically a strip handling system which may be used for handling strip material suitable for insulating or jacketing electrical conductors. The strip material may be formed from a neoprene compound, rubber compound, or a synthetic, rubber-like compounds, such as a Buna-S compound, which may be vulcanized, or may be made of any one of various thermoplastic materials, such as polyvinyl compounds or polyethylene, which may be extruded as an insulating covering or jacket on a continuously advancing filamentary core, such as one or more copper wires.

The numeral 10 designates a strip extruder designed to receive successive batches of mixed compounds and extrude them therefrom in the form of a continuous compound strip 11, which passes directly into a cooler 12. The compound strip travels a tortuous path around drums 13—13 provided in the cooler 12, and is subjected to a plurality of sprays of cold water to reduce the temperature of the strip 11. The compound strip leaves the cooler 12 and passes under pulleys 16—16 and over a pulley 17 forming part of a temperary strip-storing apparatus 18. The strip passes from the storage apparatus 18 to an intermediate strip takeup and storage apparatus 19 where the compound strip 11 is taken up on the plurality of takeup reels 20—20 mounted independently on a shaft 21 (Fig. 3).

The strip 11, stored on the reels 20—20 is withdrawn therefrom by a conveyor 22, which carries the compound strip to an extruder 23, and by a second conveyer 24, which carries the strip to a second extruder 25. Each of the extruders 23 and 25 is designed to work the compound strip into a plastic state and then extrude it in the form of an insulating covering or jacket on a filamentary core 26, which is withdrawn from a supply reel 27 and continuously advanced through the forming die of its respective extruder.

A method of and apparatus for handling the compound strip 11 between the extruder 10 and the extruders 23 and 25 is disclosed more fully and claimed in a copending application Serial No. 103,434, filed July 7, 1949, by R. R. Barber, G. E. Henning, and B. A. Raetsch, "Methods of and Systems for Processing Vulcanizable Compounds."

The extruder 10, which converts the mixed compound into a continuous strip 11, is capable of supplying the compound strip at a rate sufficient to maintain the extruders 23 and 25 in continuous operation. The takeup apparatus 19 is designed to take up the compound strip 11 on any one of the reels 20—20 that is empty, and to permit the strip previously taken up to be withdrawn from another one of the reels by the conveyor 22 or the conveyor 24.

The temporary strip-storage apparatus 18 is provided between the cooler 12 and the strip takeup apparatus 19 for the purpose of taking up the compound strip 11 during the time that the comopund strip is severed from a full reel and is connected to an empty reel of the strip takeup apparatus 19. When the switch-over from a full reel to an empty reel is completed, the particular takeup reel to which the end of the strip is attached is rotated to reel up the compound strip at such a rate that it will take up the compound strip stored in the storage apparatus 18, after which the reel rotates at a slower speed to take up the strip 11 at the rate that it is delivered from the extruder 10.

The extruder 10, the cooler 12, the temporary strip storage apparatus 18, the conveyors 22 and 24 and the extruders 23 and 25 do not form a part of the present invention, hence, no detailed description thereof, is required.

The strip takeup apparatus 19, to which the present invention is particularly directed, is shown clearly in Figs. 2 and 3, and consists of a circular base 30 having the central portion thereof formed concavely so that only a portion of the periphery of the base rests on the floor where the strip takeup apparatus 19 is to be used. The base 30 has a central hub 31 rigidly secured thereto, which is provided with an internal bore to receive the end of a tubular support 32. The lower end of the support is secured to the hub 31 in a suitable manner, and the upper end thereof is provided with a plug 35 having an upwardly extending portion to which a frame 36 is secured by means of screws 37—37. The frame 36 is substantially L-shaped, and has the longer leg thereof secured to the base 30 by a plurality of screws one of which is shown and indicated by the numeral 38.

The shaft 21 is an elongated tube which is positioned over the support 32, and has an annular member 41 rigidly secured to the lower end thereof so as to support the lower end of the shaft 21 on a frictionless bearing 42 mounted on the hub 31. The upper end of the tubular end of the tubular shaft has an annular cap 46 secured thereto by bolts 47—47, the cap being designed to engage an anti-friction bearing 50 positioned in a counterbore provided in the upper end of the post 32. The anti-friction bearings 42 and 50 serve to maintain the shaft 21 freely rotatable about the post 32. A sprocket 52 is rigidly secured to the annular member 41, and engages an endless chain 53 driven by a sprocket 54 provided on a gear reducer 55. The input shaft 56 of the gear reducer 55 is provided with a pulley 58, which is connected to a variable pitch pulley 60 provided on the armature shaft of a motor 61 by a belt 62. During the normal operation of the strip takeup apparatus 19, the motor 60 is energized continuously and rotates the shaft 21 at a predetermined rate of speed determined by the pitch of the pulley 60 and the fixed rotation of the gear reducer.

Each of the reels 20—20 is arranged to be selectively driven by the rotating shaft 21 or freed from the shaft 21 by a clutch mechanism 63 positioned beneath each of the reels. The clutch mechanism 63 per se does not form a part of the present invention. Hence, only so much of the clutch mechanism as is necessary for a clear understanding of the invention will be described. The clutch mechanism 63 is more fully described and claimed in a copending application Serial No. 103,435, filed July 7, 1949, by P. R. Powell for "Clutches."

Since the clutch mechanism for each reel is identical in construction and operation, only the clutch mechanism shown in section beneath the lowermost reel in Fig. 3 will be described in detail.

The clutch mechanism 63 consists generally of a clutch plate 65 slidably positioned on the shaft 21 adjacent to its associated reel, a free wheeling ring 66 positioned adjacent to the clutch plate 65, and a stationary annular member 67 positioned beneath the ring 66. The ring 66 is positioned slidably on a sleeve 71 positioned slidably on the shaft 21. The annular member 67 is positioned slidably on a bushing 72 positioned slidably on the shaft 21. A grease retaining cup 73 is positioned between the bushing 72 and the hub 41 of the shaft 21 to retain the lubricant applied between the annular member 67 and the bushing 72. A spacer 75 is positioned slidably on the shaft 21 so that the lower end thereof engages the top surface of the clutch plate 65 and upper end thereof engages the bottom of another bushing like the bushing 72 positioned on the shaft 21 to support an annular member like the member 67 forming part of the clutch mechanism for the next reel.

A clutch plate 65, a sleeve 71 and a bushing 72 are positioned on the shaft 21 in the manner shown in Figs. 2 and 3 for each clutch mechanism of the takeup apparatus 19, are spaced a predetermined distance apart by the spacers 75—75. A spacer 76 is positioned on the shaft 21 so that the end thereof engages the top surface of the uppermost clutch plate 65 while the upper end thereof engages an annular shoulder provided on the cap 46 secured to the shaft 21. When the cap 46 is clamped securely in place by the bolts 47—47, it presses downwardly so as to lock the spacers 75—75, the clutch plates 65—65, the sleeves 71—71 and the bushings 72—72 tightly together between the hub 41 and the cap 46. By virtue of this arrangement, the spacers, the clutch plates, the sleeves and the bushings are locked for rotation with the shaft 21. As a result, when the shaft is rotated, the clutch plates 65—65 are rotating beneath their respective reels 20—20.

Each of the reels 20—20 has a circular head 77 provided with a central hub 80 having a bore, which permits the reel to be positioned rotatably on the spacers 75—75. Each of the reels 20—20 also is provided with a winding drum 81 secured rigidly to the head 77 for coiling up the compound strip 11 emerging from the extruder 10. Since the reel 20 is freely rotatable about the spacer 75, the weight of the reel causes the head 77 to rest on segments 82—82 made of suitable friction material and attached to the top surface of the clutch plate 65 when the free wheeling ring 66 is in the position shown in Figs. 2 and 3.

The free wheeling ring 66 is provided with three rollers 84—84 spaced equally around the periphery thereof. The ring 66 is positioned slidably on the sleeve 71, and is supported on the annular member 67 by three dumbbell-shaped pins 85—85 seated in recesses 86—86 spaced equally about the ring 66 and recesses 87—87 spaced equally about the annular member 67. When the recesses 86—86 and 87—87 of the ring 66 and the annular member 67, respectively, are aligned longitudinally, the dumbbell-shaped pins 85—85 are positioned perpendicularly between the annular member 67 and the ring 66. When the pins 85—85 are so positioned, they support the ring 66 so that the rollers 84—84 mounted on the ring 66 do not engage the underside of the head 77 (Fig. 3).

A bar 90 has one end thereof attached to the annular member 67 and the other end thereof secured to the frame 36, in order to prevent rotation of the annular member 67 when the bushing 72 and the shaft 21 are rotated by the motor 61. A support 91 has one end thereof secured to the annular member 67 and the free end thereof turned upwardly at 92 so that it is substantially perpendicular to the head 77 of the adjacent reel. The upturned end 92 of the support 91 is provided with notches 93 and 94, which are designed to be engaged by a lever 96 having the inner end thereof attached to the free wheeling ring 66.

Referring to Fig. 4, it is noted that the winding drum 81 of each reel is provided with an opening 98 in which is positioned a post 100. An arcuate member 101 has one end thereof hingedly mounted on the post 100 so that the free end thereof may be moved outwardly away from the drum 81 to a position adjacent to the periphery of the head 77. The drum 81 also is provided with an opening 102, which receives a strip clamp mechanism mounted on the free end of the member 101. The strip clamp consists of a bar 103 hingedly mounted on a support 104 secured to the free end of the member 101 by means of a pin 105 (Figs. 5 and 6). A spring 106 is positioned over the pin 105 in the hinged connection between the bar 103 and the support 104 so as to continuously urge the bar 103 in a counterclockwise direction, as seen in Fig. 5, so that the free end thereof normally rests against the end of the member 101. When the end of the compound strip 11 is inserted in the support 104, it moves the bar 103 away from the arcuate member 101, in which case, the bar 103 grips the end of the strip 11 and clamps it tightly against the end of the arcuate member 101. A lever 107 is secured on the upper and of the bar so that the bar 103 may be turned in a clockwise direction against the action of the spring 106 to release the end of the strip 11 from the end of the arcuate member 101 when desired.

*Operation*

Let it be assumed that the extruder is converting a mixed compound of extrudable material into the strip 11 at a predetermined rate, and that the reels 20—20 of the takeup apparatus 10 are empty. Let it be assumed further that the motor 61 is connected to a suitable source of potential, and is energized to rotate the shaft 21 and each of the spacers 75—75, the clutch plates 65—65, the sleeves 71—71 and the bushings 72—72, which are locked for rotation with the shaft 21 by the cap 46. Each of the levers 96—96 is positioned in the notch 93 of its respective support 91, in which position each lever holds its respective ring 66 in such a position that the recesses 86—86 provided in the ring 66 are misaligned with respect to the recesses 87—87 provided in the annular member 67. This position of the ring 66 tilts its respective pins 85—85 so that they are positioned obliquely between the ring 66 and the annular member 67 (Fig. 11). When the pins are positioned obliquely as described, they slide their respective ring 66 upwardly on the sleeve 71 so that the rollers 84—84 provided on the ring engage the head 77 of the reel 20 and disengage it from the segments 82—82 positioned on its respective clutch plate 65.

When each of the levers 96—96 is so positioned on the rollers of their respective ring, none of the reels 20—20 is rotated about the central support 32. With the strip takeup apparatus 10 so adjusted, the leading end of the compound strip 11 is attached to the winding drum 81 of the uppermost reel. To attach the end of the strip to the winding drum, the arcuate member 101 of the drum is moved outwardly to its broken line position shown in Fig. 4, and the end of the strip is inserted between the spring-pressed bar 103 and the end of the member.

After the end of the strip is clamped to the end of the member 101, the uppermost lever 96 is disengaged from the notch 93 and is positioned in the notch 94 of its respective support 91. This movement of the lever 96 turns the ring 66 in a counterclockwise direction as viewed in Fig. 9, and aligns the recesses 86—86 provided in the ring 66 with the recesses 87—87 provided in the annular member 67. This arrangement of the recesses 86—86 and 87—87 moves the pins 85—85 from their oblique positions to vertical positions, thereby allowing the ring 66 to slide downwardly on the sleeve 71. This downward movement of the ring 66 is sufficient to disengage the rollers 84—84 from the head 77 of the uppermost reel 20 and allows the reel to move downwardly until the head 77 thereof rests against the friction segments 82—82 provided on the adjacent clutch plate 65. Since the clutch plate 65 is rotated continuously with the shaft 21, it rotates the reel 20 by virtue of the engagement of the head 77 with the friction segments 82—82.

The clutch plate 65 rotates the reel 20 in a clockwise direction, as viewed in Fig. 4 and creates a pull on the strip 11, which causes the arcuate member 101 to move inwardly and lay against the portion of the drum 81 positioned between the openings 98 and 102. The uppermost reel continues to rotate in this direction and coil up the strip 11 until the reel is full, at which time the uppermost lever 96 is returned to the notch 93 so as to tilt the pins 85—85 and raise the ring 66 upwardly so that the rollers 84—84 thereof engage the head 77 and lift the reel off the clutch plate 65. The compound strip 11 is severed, and the leading end thereof is secured to the winding drum 81 of the next lower reel 20.

The lever 96 associated with the latter reel, is actuated to move its respective pins 85—85 to their vertical positions as shown in Fig. 11, and thereby lowers the second reel so that it is rotated by its respective clutch plate 65. After the second reel starts to coil up the strip 11, the compound strip coiled on the uppermost reel 20 may be withdrawn therefrom by the conveyor 22 and fed to the extruder 23, whereby the extruder 23 is placed in operation to work the compound into a plastic state and extrude it on the core 26 in accordance with well-known extruding practices. It should be noted that the uppermost reel 20 is resting on the rollers 84—84 and thereby is rotatable freely about the shaft 21 and that the withdrawal of the strip 11 rotates the uppermost reel 20 in a direction opposite to that in which the shaft 21 is rotated by the motor 61.

As soon as the second reel is full, the second lever 96 is positioned in its notch 93 to terminate the rotation of the second reel in the manner described, and the compound strip is severed so that the leading end thereof may be connected to the winding drum 81 of the third reel. Since the extruder 10 is forming the strip 11 at a rate which is at least twice the rate at which the strip 11 is consumed by the extruder 23, the second reel will fill before one-half of the length of strip coiled on the uppermost reel is completely withdrawn therefrom because the extruder 23 started to use the strip after the second reel started to coil up the strip. Therefore, since the second reel 20 contains its maximum quantity of the strip 11 before the strip is completely withdrawn from the first reel 20, at least a reel full of the strip 11 is stored on the strip takeup apparatus 19 by the time the first reel is exhausted. As the result, a continuous supply of the strip 11 is provided for the extruder 23, because as soon as the first reel is exhausted the end of the compound strip wound on the second reel is withdrawn therefrom and inserted in the conveyor 22 which conveys the strip to the extruder 23.

While the compound strip is being withdrawn from the first reel by the conveyor 22, the third lever 96 is positioned in its respective notch 94, whereupon the third reel is rotated and coils up the compound strip 11. When the third reel is filled with the strip 11, the strip is severed and the leading end thereof is connected to the hinged member of the winding drum 81 of the fourth reel 20. The fourth lever 96 is positioned in the notch 94 of its respective support to cause the reel to be driven by its clutch plate and coil up the strip 11. The end of the strip on the third reel is placed on the conveyor 24 which withdraws the strip from the third reel and conveys it to the extruder 25. The extruder 25 works the compound strip into a plastic state and extrudes it on a core 26 being advanced therethrough in the form of an insulating covering or jacket.

Shortly after the fourth reel starts to coil up the strip 11, the extruder 23 consumes the length of the strip coiled up on the first reel, in which case, the strip on the second reel is fed to the extruder 23 by the conveyor 22. The fourth reel fills up before the extruder 25 uses one-half the strip coiled on the third reel because the extruder 10 is forming the strip twice as fast as it is used by the extruder 25. This arrangement provides a continuous supply of the compound strip to the extruder 25 because as soon as the extruder 25 uses the strip on the third reel it is supplied with the strip stored on the fourth reel. As soon as the fourth reel takes up its maximum length of the compound strip, the reel is disconnected from its clutch plate in the manner described, the strip is severed, and the leading end is connected to the winding drum of the first reel. The first reel then is engaged by its clutch plate to coil up a length of the strip to be used by the extruder 23 after it has used the strip on the second reel. This same procedure is followed as each reel becomes exhausted so as to maintain a supply of the compound strip which will keep the extruders 23 and 25 in continuous operation for sustained periods of time.

It should be noted that each clutch plate 65 is designed so that the friction segments 82—82 thereof engage the head 77 of its respective reel 20 a predetermined distance from the central axis of the post 32. This spacing of the friction segments 82—82 on the clutch plates causes them to drive their respective reels 20—20 with a force sufficient to coil up the compound strip and create a predetermined tension on the strip at the beginning of the coiling operation. As the amount of compound strip taken up by the reel increases, the weight carried by the reel is increased and as a result the reel bears more heavily against the friction segments 82—82 of its respective clutch plate 65. Therefore, as the winding diameter of the reel increases, the torque exerted on the reel 20 increases by a corresponding amount and thereby maintains a substantially uniform tension on the compound strip as the strip coiling operation proceeds from an empty reel to a full reel.

As the winding diameter of the reel increases due to the build up of the layers of compound strip on the winding drum 81, the speed of rotation of the reel 20 decreases constantly since the strip is being supplied to the reel at a uniform rate. This results because, as the winding diameter of the reel builds up the reel slips with respect to the clutch plate 65, and thereby maintains a uniform tension on the strip as it is coiled up by continuously adjusting its speed in accordance with the change in its winding diameter.

In the above-described operation of the strip takeup and storage apparatus 19, the first and second reels 20—20 were allocated to keep the extruder 23 supplied with the compound strip, and the third and fourth reels were allocated to keep the extruder 25 supplied with the compound strip. The strip takeup and storage apparatus 19 may be operated so that the first and third reels are allocated to one of the extruders, while the second and fourth reels are allocated to the other extruder, because each reel is driven independently by the shaft 21, and each reel may be placed in its free wheeling position independently of the other reels.

It should be noted that two or more of the reels may be driven simultaneously to take up two lengths of compound strip where operating or manufacturing conditions require such an arrangement.

The provision of the strip takeup and storage apparatus 19 in the above-described strip handling scheme, eliminates the necessity of coiling the strip on small reels, which must be conveyed to the extruders and permits greater lengths of strip material to be coiled up on the apparatus 19 and fed to the extruders because no lifting or other manual handling of reels of compound strip is required.

While the strip takeup apparatus 19 has been described as an apparatus designed to facilitate the handling of a compound strip between a continuously operating strip forming means and a plurality of strip consuming means it also may be used to provide an adequate supply of strip material to the strip consuming means where the material handling system includes an intermittent strip supply and continuously operating strip consuming apparatus. For example, certain types of vulcanizable compounds, batches of material are discharged from mixing apparatus to conventional milling apparatus where the compound may receive additional ingredients or working both. Usually, the batch of compound is withdrawn from the mill in strip form and placed on reels for use by extruding apparatus like that described. In such a scheme, the strip from the entire batch of compound may be withdrawn from milling apparatus and taken up and stored on one or more strip takeup and storage apparatus like the apparatus 19. Since the entire batch of compound is stored up on the apparatus 19, it may be fed to a plurality of extruders designed to apply as an insulating covering or jacket around a filamentary core while another batch is being prepared on the milling apparatus. Thus, the strip takeup device 19 may readily be used to maintain a plurality of extruders in continuous operation for sustained periods of time from an intermittent supply source.

While the above-described takeup apparatus is adapted for taking up and storing a compound strip at a point intermediate a strip-forming means and a conductor insulating means, it may be readily adapted to handle various kinds of strip material encountered in many different processes without departing from the spirit and scope of the invention.

What is claimed is:

1. An apparatus for handling strip material, which comprises a vertically positioned post, a tubular shaft mounted rotatably on the post, a plurality of reels spacedly positioned on the shaft so as to be rotatable with respect to the shaft, an annular clutch plate secured on the shaft beneath each reel so as to be rotated by the shaft and having friction members provided on the surface thereof adjacent to its respective reel, said reels being slidably positioned with respect to the shaft so that the weight of the reel causes it to rest on the friction members provided on its respective clutch plate and be rotated by the shaft to take up the strip material, and means provided adjacent to each clutch plate and operable to move its associated reel upwardly so as to disengage it from its respective clutch plate and support the reel rotatably with respect to the clutch plate so that the strip material may be withdrawn therefrom, whereby each of the reels may be driven independently by the shaft with respect to the reels positioned thereon while the remaining reels are supported rotatably out of engagement with their respective clutch plates.

2. Apparatus for taking up and storing strip material supplied at a uniform rate, which comprises a vertically positioned post, a tubular shaft mounted rotatably on the post, means for continually rotating the tubular shaft, a plurality of reels designed to take up the strip material slidably and spacedly positioned on the shaft, a plurality of clutch plates spacedly secured on the shaft for rotation therewith and positioned so that a clutch plate is beneath each reel and each plate having a friction surface on the side thereof adjacent to its respective reel, said reels being positioned normally on the shaft so that the force of gravity causes the reels to rest upon the friction surfaces of their respective clutch plates and be rotated thereby to take up strip material, said force increasing as the winding diameter of each reel increases and the reel becomes filled, thereby increasing the torque exerted on the reel by the adjacent friction surface in such a manner as to maintain a substantially uniform tension on the strip material as the strip coiling operation proceeds from an empty reel to a full reel, an annular member positioned concentrically on the shaft below each clutch plate and secured against rotation by the shaft, cam means positioned on each annular member and operable to disengage its associated reel from the adjacent friction surface and support the reel rotatably with respect to the shaft so that the strip material may be withdrawn therefrom.

3. Apparatus for taking up and storing strip material supplied at a uniform rate, which comprises a vertically positioned post, a tubular shaft mounted rotatably on the post, means for continually rotating the tubular shaft, a plurality of reels designed to take up the strip material slidably and spacedly positioned on the shaft, a plurality of clutch plates spacedly secured on the shaft for rotation therewith and positioned so that a clutch plate is beneath each reel, friction elements secured on the surface of each clutch plate adjacent to its respective reel, said reels being positioned normally on the shaft so that the force of gravity causes the reels to rest upon the interposed friction elements on their respective clutch plates and be rotated thereby to take up strip material, said force increasing as the winding diameter of each reel increases and the reel becomes filled, thereby increasing the torque exerted on the reel by the adjacent friction element in such a manner as to maintain a substantially uniform tension on the strip material as the strip coiling operation proceeds from an empty reel to a full reel, and cam means provided adjacent to each clutch plate and operable for moving its associated reel upwardly so as to disengage it from the adjacent friction elements and support the reel rotatably so that the strip material may be withdrawn therefrom, whereby any one of the reels may be driven by the shaft while the remaining reels remain stationary with respect to the shaft.

4. An apparatus for taking up and storing strip material supplied at a uniform rate, which comprises an annular base, a post secured to the base in an upright position, a tubular shaft mounted rotatably on the post, a hub secured to the lower end of the tubular shaft, a sprocket rigidly secured to the hub, means for turning the sprocket to continually rotate the tubular shaft about the post, a plurality of clutch plates positioned slidably and spacedly on the shaft, a friction element secured on the upper surface of each clutch plate, a tubular spacer positioned between each of the clutch plates to space the clutch plates a predetermined distance apart, means provided on the upper end of the tubular shaft for clamping the spacers and clutch plates tightly together for rotation with the shaft, a reel designed to take up strip material positioned slidably and rotatably on each of the spacers above each clutch plate secured on the shaft, means provided on each reel for gripping the end of the strip material, said reels being slidably positioned on the spacers so that the weight thereof urges the reels downwardly against the friction elements on their respective clutch plates whereby the reels are rotated by the shaft to take up the strip material, and cam means positioned adjacent to each clutch plate and selectively operable to disengage the adjacent reel from its cooperating friction elements and rotatably support the reel so that the strip material may be withdrawn therefrom, whereby each of the reels may be driven independently by the shaft to take up strip material while other reels may be supported rotatably by their respective cam means so that strip material may be withdrawn from the reels.

5. An apparatus for handling strip material, which comprises a vertically positioned tubular shaft, means for rotating said shaft, a plurality of reels spacedly positioned on the shaft so as to be rotatable with respect to the shaft, an annular clutch plate secured on the shaft beneath each reel so as to be rotated by the shaft and having a friction surface on the side thereof adjacent to its respective reel, said reels being slidably positioned with respect to the shaft so that the weight of each reel causes it to rest on its cooperating friction surface and be rotated by the shaft to take up the strip material, and means provided adjacent to each clutch plate and operable to move its associated reel upwardly so as to disengage it from its cooperating friction surface and support the reel rotatably with respect to the clutch plate so that the strip material may be withdrawn therefrom, whereby each of the reels may be driven independently by the shaft with respect to the reels positioned thereon while one or more of the other reels are supported rotatably out of engagement with the friction surfaces of their respective clutch plates.

ROBERT R. BARBER.
PAUL R. POWELL.
BRUNO A. RAETSCH.

REFERENCES CITED

The following references are of record in the file of this patent:

UNITED STATES PATENTS

| Number | Name | Date |
|---|---|---|
| 274,953 | Lynam | Apr. 3, 1883 |
| 937,551 | Remmen | Oct. 19, 1909 |
| 1,041,010 | Brownell | Oct. 15, 1912 |
| 1,466,379 | Mason | Aug. 28, 1923 |
| 1,853,384 | Snow | Apr. 12, 1932 |
| 2,343,961 | Del Valle | Mar. 14, 1944 |
| 2,424,739 | Canady | July 29, 1947 |
| 2,436,717 | Foster | Feb. 24, 1948 |